United States Patent
Poeppl et al.

(10) Patent No.: US 9,573,190 B2
(45) Date of Patent: Feb. 21, 2017

(54) COOLED STRAND GUIDE ROLLER MOUNTED AT MORE THAN ONE LOCATION

(71) Applicant: PRIMETALS TECHNOLOGIES AUSTRIA GMBH, Linz (AT)

(72) Inventors: Johann Poeppl, Kirchschlag (AT); Guoxin Shan, Leoben (AT); Heinrich Thoene, Linz (AT); Franz Wimmer, Riedau (AT)

(73) Assignee: PRIMETALS TECHNOLOGIES AUSTRIA GMBH (AT)

( * ) Notice: Subject to any disclaimer, the term of this patent is extended or adjusted under 35 U.S.C. 154(b) by 143 days.

(21) Appl. No.: 14/432,156

(22) PCT Filed: Sep. 3, 2013

(86) PCT No.: PCT/EP2013/068154
§ 371 (c)(1),
(2) Date: Mar. 27, 2015

(87) PCT Pub. No.: WO2014/048685
PCT Pub. Date: Apr. 3, 2014

(65) Prior Publication Data
US 2015/0258605 A1  Sep. 17, 2015

(30) Foreign Application Priority Data
Sep. 28, 2012  (AT) .................... A1057-2012

(51) Int. Cl.
*B22D 11/124* (2006.01)
*B22D 11/128* (2006.01)

(52) U.S. Cl.
CPC ......... *B22D 11/1287* (2013.01); *B22D 11/124* (2013.01); *B22D 11/1246* (2013.01); *B22D 11/1284* (2013.01); *B65G 2207/22* (2013.01)

(58) Field of Classification Search
CPC . B22D 11/124; B22D 11/1246; B22D 11/128; B22D 11/1284; B22D 11/1287
(Continued)

(56) References Cited

U.S. PATENT DOCUMENTS 2,947,075 A * 8/1960 Schneckenburger et al. ............... B22D 11/08
164/263
4,603,729 A   8/1986 Harada
(Continued)

FOREIGN PATENT DOCUMENTS

AT      337385      6/1977
CN      85108682 A  5/1986
(Continued)

OTHER PUBLICATIONS

Siemens Vai:"Strandguide Roller—Preconfigured products for precision applications"; XP002721379; gefunden im Internet: URL:http://www.industry.siemens.com/datapool/industry/industrysolutions/metals/simetal/en/Strandguide-Roller-en.pdf; das ganze Dokument; 2007; AT.
(Continued)

*Primary Examiner* — Kevin P Kerns
(74) *Attorney, Agent, or Firm* — Ostrolenk Faber LLP (57) ABSTRACT

A cooled strand guide roller (1) mounted at more than one location for guiding a metal strand (S) in a continuous casting machine, and a method for cooling a strand guide roller (1) mounted at more than one location. An internally cooled strand guide roller (1) is mounted at more than one location. The height of the strand guide roller (1) is intended to be adjustable easily and quickly. The strand guide roller (1) has a collecting bar (7) for supplying the strand guide roller (1) with cooling water. The collecting bar (7) includes a plurality of brackets (10, 10a, 10b). Between two successive brackets (10, 10a, 10b), there is at least one coolant pipe
(Continued)

(11) for fluidically connecting the brackets (10, 10a, 10b). An outer bracket (10a) has at least one first connection (8) for internal cooling of the cooled strand guide roller (1) and at least one second connection (9) for cooling the bearing blocks (4). The first connection (8) is fluidically connected to the ducts (3) of the individual rollers (2a, 2b) and the second connection (9) is fluidically connected to the bearing blocks (4) via the brackets (10).

14 Claims, 6 Drawing Sheets

(58) Field of Classification Search
USPC .......................................... 164/269, 442, 448
See application file for complete search history.

(56) References Cited

U.S. PATENT DOCUMENTS

| | | | | |
|---|---|---|---|---|
| 4,676,297 | A | 6/1987 | Kriegner | 164/442 |
| 5,125,334 | A | 6/1992 | Cappel | |
| 5,649,889 | A * | 7/1997 | Warner, III | F16C 19/52 |
| | | | | 164/442 |
| 7,617,862 | B2 | 11/2009 | Guttenbrunner | 164/448 |
| 8,267,154 | B2 | 9/2012 | Springmann | 164/442 |
| 2006/0183614 | A1* | 8/2006 | Brotzki et al. | B22D 11/1287 |
| | | | | 492/46 |
| 2011/0114282 | A1 | 5/2011 | Hovestadt | 164/448 |

FOREIGN PATENT DOCUMENTS

| | | |
|---|---|---|
| CN | 1777483 A | 5/2006 |
| CN | 102076444 A | 5/2011 |
| CN | 102873292 A | 1/2013 |
| DE | 102008029944 A1 | 12/2009 |
| DE | 102011003194 A1 | 11/2011 |
| DE | 2010 062 355 A1 | 6/2012 |
| WO | WO 99/26745 A1 | 6/1999 |
| WO | WO 2011/026957 A1 | 3/2011 |
| WO | WO 2011117383 A1 | 9/2011 |
| WO | WO 2011144505 A1 | 11/2011 |
| WO | WO 2013026689 A1 | 2/2013 |

OTHER PUBLICATIONS

International Search Report dated Mar. 21, 2014 issued in corresponding International patent application No. PCT/EP2013/068154.
Written Opinion dated Mar. 21, 2014 issued in corresponding International patent application No. PCT/EP2013/068154.
Austrian Search Report Jul. 1, 2013 issued in corresponding Austrian patent application No. A1057-2012.
International Preliminary Report on Patentability dated Nov. 7, 2014 issued in corresponding International patent application No. PCT/EP2013/068154.
Chinese Office Action, dated Mar. 28, 2016, issued in corresponding Chinese Patent Application No. 201380050960.2. English Translation. Total 14 pages.

* cited by examiner

COOLED STRAND GUIDE ROLLER MOUNTED AT MORE THAN ONE LOCATION

CROSS-REFERENCE TO RELATED APPLICATIONS

The present application is a 35 U.S.C. 371 national phase conversion of PCT/EP2013/068154, filed Sep. 3, 2013, which claims benefit of Austrian Patent Application No. A1057-2012, filed Sep. 28, 2012, the contents of which are incorporated by reference herein. The PCT International Application was published in the German language.

FIELD OF TECHNOLOGY

The present invention relates to a cooled strand guide roller mounted at more than one location for guiding a metal strand in a continuous casting machine and to a method for cooling a strand guide roller mounted at more than one location.

In the context of continuous casting, a strand guide is customarily used to guide, support and further cool a metal strand (e.g. made of steel) which has been formed in a mold. It is normal practice for the partially or totally solidified strand to be supported and guided by strand guide rollers. The strand can also be cooled by cooled strand guide rollers. As a result of the high temperature of the strand and the high ferrostatic pressures in the strand, the strand guide rollers are subjected to high thermal and mechanical stresses.

Specifically, the invention relates firstly to a strand guide roller for guiding a metal strand in a continuous casting machine, comprising
  at least one first and one second individual roller, wherein the first individual roller is connected in a non-rotatable manner to the second individual roller, the individual rollers have a duct for internal cooling and form a cooled strand guide roller;
  at least three bearing blocks, wherein the outer regions of the strand guide roller and at least one region between two adjacent individual rollers are rotatably mounted at a bearing block.

In addition, the invention relates to a method for cooling a strand guide roller mounted at more than one location.

Specifically, the invention relates to a method for cooling a strand guide roller mounted at more than one location, comprising:
  the at least one first and one second individual roller, wherein the first individual roller is connected in a non-rotatable manner to the second individual roller, and the individual rollers each have a duct for the internal cooling of the strand guide roller;
  at least three bearing blocks, wherein the outer regions of the strand guide roller and the region between the individual rollers are rotatably mounted at a bearing block;
  a manifold bar for supplying the strand guide roller with cooling water, comprising a plurality of brackets and at least one coolant pipe between two successive brackets in each case, wherein an outer bracket has in each case a first connection for the internal cooling of the strand guide roller and a second connection for cooling the bearing blocks, and the first connection is fluidically connected to the ducts of the individual rollers and the second connection is fluidically connected to the bearing blocks.

PRIOR ART

Internally cooled strand guide rollers mounted at more than one location are already disclosed in the prior art (see e.g. the publication: Strandguide Roller—Preconfigured products for precision applications, Siemens VAI, 2007). An embodiment variant of a so-called CSR (Compact Split Roller) strand guide roller is composed of a plurality of individual rollers which are connected together in a non-rotatable manner. In order to reduce the thermal stress of the bearing, the bearing blocks are likewise cooled in an embodiment variant of a CSR roller. In this configuration, the underside of each bearing block has two connections for the introduction and discharge of cooling water. Since the strand guide rollers are subject to wear and the diameter of the circumferential surface of the roller therefore changes, it must be possible to set the height of the strand guide roller. For this purpose, a shim is inserted between a crossbar of the strand guide and a bearing block, wherein the shim must nonetheless have openings for the cooling water connections in the bearing block. The shims consequently become very complex and the setting of the height becomes costly. The prior art does not suggest how an internally cooled strand guide roller mounted at more than one location can be designed in a simple, robust and operationally reliable manner while also offering ease of height adjustment.

SUMMARY OF THE INVENTION

The object of the invention to overcome the disadvantages of the prior art and to specify a internally cooled strand guide roller mounted at more than one location, said roller being embodied in a simple, robust and operationally reliable manner. Provision is further made for the height of the roller to be easily and quickly adjustable.

A further object of the invention is to specify a method for cooling a strand guide roller mounted at more than one location.

Specifically, in the case of a strand guide roller of the type cited in the introduction, the object is achieved by means of a manifold bar for supplying the strand guide roller with cooling water, comprising a plurality of brackets and in each case at least one coolant pipe between two successive brackets for the fluidical connection of the brackets. An outer bracket has in each case at least one first connection for the internal cooling of the cooled strand guide roller and at least one second connection for cooling the bearing blocks, wherein the first connection is fluidically connected to the ducts of the individual rollers and the second connection is fluidically connected via the brackets to the bearing blocks.

The strand guide roller according to the invention has two separate cooling circuits. The first cooling circuit ensures internal cooling of the strand guide roller composed of individual rollers and the second circuit ensures internal cooling of the bearing blocks (the second circuit connects the bearing blocks together and causes a cooling of the bearing or the bearing blocks). This has the significant advantage that the cooling water quantities for both circuits and hence also the temperatures of the strand guide roller and the bearings can be set completely independently of each other. The surface temperature of the strand guide roller can therefore be set independently of the temperature of the bearings. This allows selective cooling of the strand by the strand guide roller, particularly in the case of hot casting or dry-sand casting, without the bearings overheating in this case. As a consequence, it is also possible to use inexpensive bearings if applicable, e.g. temperature-sensitive plain bearings.

The structure according to the invention has a so-called manifold bar which is connected to the bearing blocks of the strand guide roller in a detachable manner. The manifold bar is composed of a plurality of outer brackets and at least one inner bracket. At least one coolant pipe is provided in each case between two successive brackets for the fluidical connection of the brackets. The manifold bar allows the height of the strand guide roller to be set very easily, and the manifold bar also supplies two cooling circuits with cooling water.

In this case, cooling water is introduced into the inner duct of the strand guide roller via a first connection of an outer bracket of the manifold bar. Cooling water is also introduced into the outer bracket via a second connection. The connection between two successive (adjacent) brackets is provided by at least one coolant pipe. Each bracket is also connected in a leak-proof manner to a bearing block, said bearing block comprising at least one duct for the purpose of cooling. At the same end or at the opposite end of the manifold bar, cooling water is discharged from the inner duct of the strand guide roller into an outer bracket, and is discharged from said bracket via a further first connection. In addition, cooling water which has been used for cooling the bearing blocks is discharged from the outer bracket via a second connection.

According to an embodiment variant, each outer bracket has a first and a second connection. In this type of configuration, cooling water is introduced into the strand guide roller on one side and discharged again on the opposite side of the strand guide roller. The flow through the bearing blocks behaves likewise. In this embodiment variant, the supply of the coolant into the two cooling circuits can take place on the same side or on opposite sides.

In an alternative embodiment variant, an outer bracket has two first connections and two second connections. In this case, the supply and discharge of the cooling water for both cooling circuits takes place on the same side of the manifold bar. In this type of configuration, cooling water is fed into the strand guide roller at one end and flows lengthways through the roller. The direction of flow is then reversed at the opposite end of the strand guide roller, and the cooling water flows lengthways through the roller before being drained off at the same end of the strand guide roller. The flow through the bearing blocks behaves likewise. For example, the cooling water is supplied from bracket to bracket by means of a first series of coolant pipes, the direction of flow of the cooling water is reversed at the last bracket, and the cooling water is then discharged again from bracket to bracket via a second series of coolant pipes.

In an advantageous embodiment variant, the manifold bar has two coolant pipes between two successive brackets for the purpose of connecting the brackets. This means firstly that the brackets are jointly secured against rotation, and secondly that the coolant can be carried through one coolant pipe in one direction and through the second coolant pipe in the opposite direction.

In an appropriate embodiment, a first connection of an outer bracket is connected to a duct of the individual roller via a line and a rotary inlet. The line can be a pipeline or a hose.

In order to effect uniform cooling of a bearing block which is divided into a lower part and an upper part by a horizontal plane running through the rotational axis of the strand guide roller, the lower part has at least two holes that are staggered in the direction of casting. Thermal distortions of the bearing are thereby prevented. In this embodiment variant, it does not matter whether the upper part and the lower part are connected together in a detachable manner or embodied as a single component (so-called monoblock).

A bearing in the bearing block is uniformly cooled if the upper part has a water duct which can carry cooling water from a first hole in the lower part around the bearing and into a second hole in the lower part. In addition to this, the lower part can also have an annular water duct.

A simple, robust and leak-proof connection between two individual rollers can be achieved if one end of the first individual roller has a spigot and one end of the second individual roller has a recess for accommodating said spigot, and the spigot is connected to the recess in a non-rotatable manner.

In an embodiment variant, the fluidical connection between a bracket and a bearing block is effected by means of a non-screwed pipe. Alternatively, the bracket can be sealed relative to the bearing block by means of an O-ring.

The manufacture of an outer bracket can be greatly simplified if the bracket, preferably on its underside, comprises an intermediate plate which is aligned parallel with the direction of casting. The intermediate plate has at least one first connection and at least one second connection. Cooling water can therefore be introduced from a strand guide segment via a non-screwed pipe and a connection into the intermediate plate, said cooling water being carried onwards from the intermediate plate via a seal (e.g. an O-ring) to a line or a coolant pipe.

In a further appropriate embodiment, a strand guide segment is connected in a detachable manner to a bracket of the manifold bar, said strand guide segment being fluidically connected to an outer bracket by means of a non-screwed pipe. A non-screwed pipe ensures a fluidical connection even in the event of a relative displacement between two components (e.g. in the case of the above cited height adjustment).

For the purpose of simple height adjustment of the bracket relative to a strand guide segment, a bracket advantageously has a screw for height adjustment of the bracket relative to the strand guide segment, wherein a shim is arranged between the bracket and the strand guide segment.

Specifically, a method of the type cited in the introduction achieves the cited object in that a first cooling water partial flow is introduced into the strand guide roller via a first connection of the manifold bar, the first cooling water partial flow flows through the individual rollers in sequence, and the first cooling water partial flow is drained out of the strand guide roller via a further first connection of the manifold bar; and in that a second cooling water partial flow is introduced into the manifold bar via a second connection, the second cooling water partial flow is carried to the bearing blocks in sequence and cools the bearing blocks, and the second cooling water partial flow is drained out of the manifold bar via a further second connection.

This solution is advantageous because both of the cooling circuits for the internal cooling of the strand guide roller and the cooling of the bearing blocks can be set independently of each other.

BRIEF DESCRIPTION OF THE DRAWINGS

Further advantages and features of the present invention are derived from the following description of non-restrictive exemplary embodiments, reference being made to the following figures in which.

DESCRIPTION OF THE EMBODIMENT VARIANTS

Figure 1:
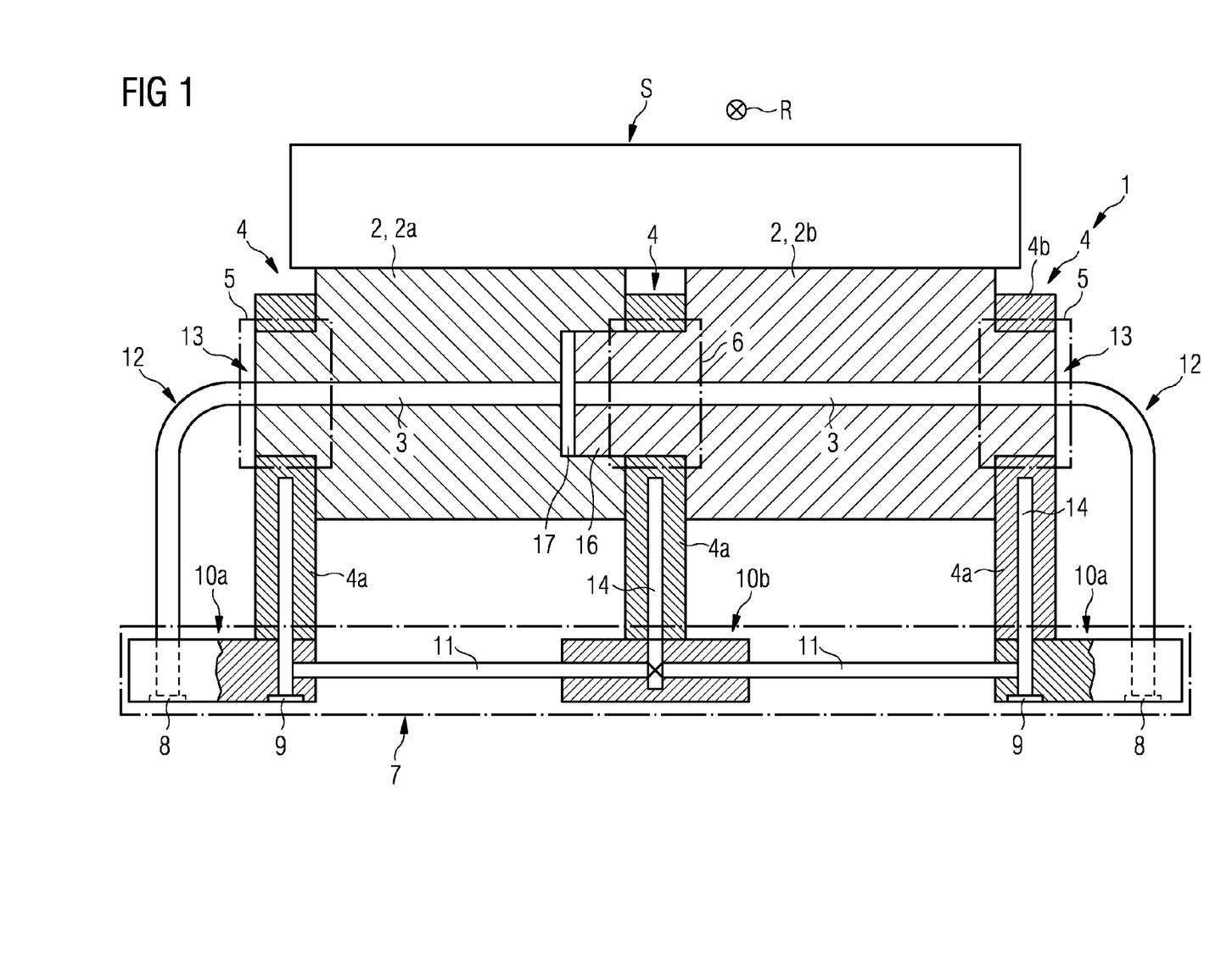
FIG. 1 shows a schematic illustration of a first embodiment variant of the strand guide roller according to the invention.
Figure 2:
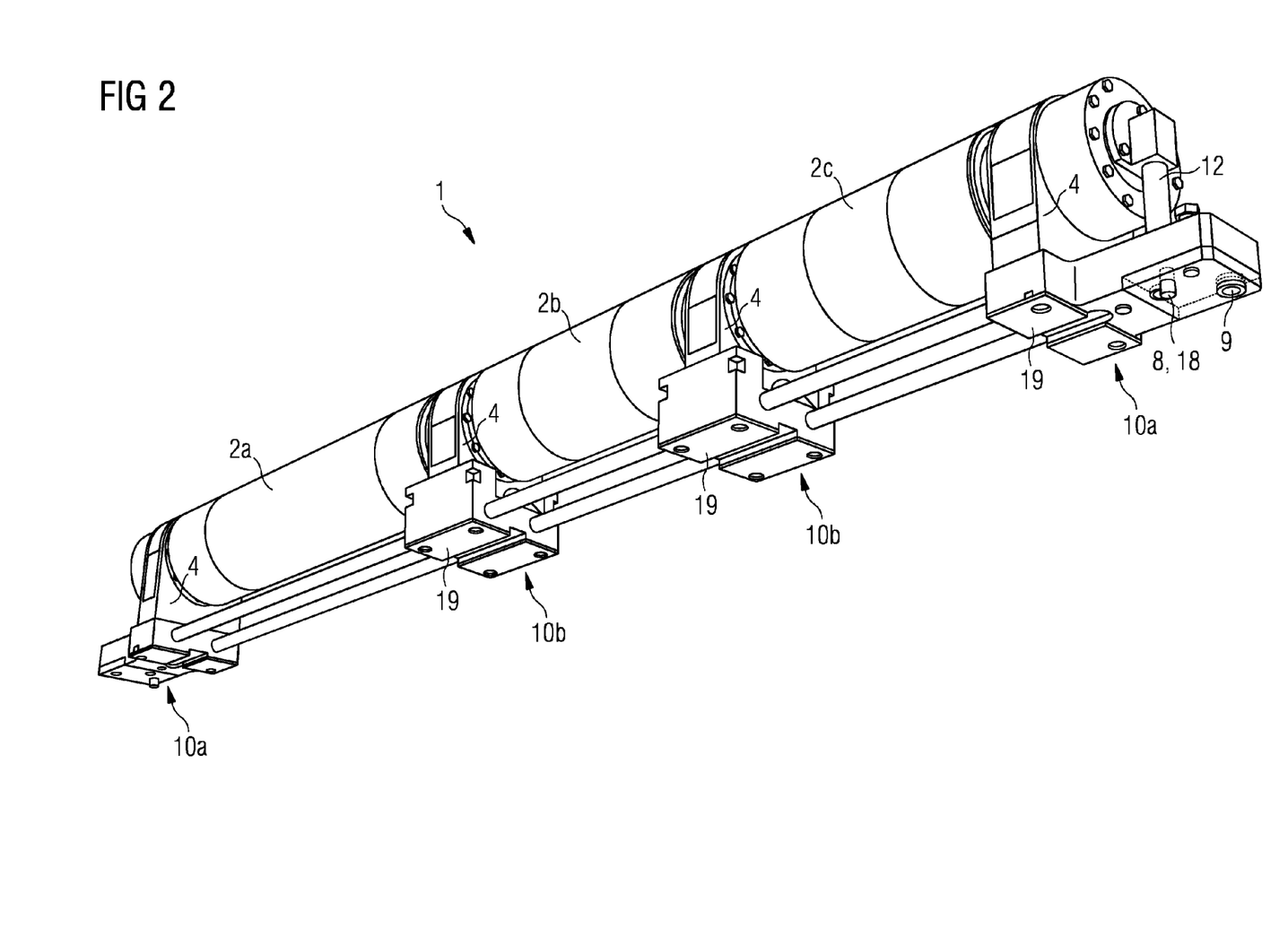
FIG. 2 shows an illustration of a second embodiment variant of the strand guide roller according to the invention.

FIG. 1 shows a schematic illustration of a strand guide roller 1 which is composed of two individual rollers 2, namely a first individual roller 2a and a second individual roller 2b. The two individual rollers 2 are connected together in a non-rotatable manner by means of a shrink fit or a force fit between a spigot 16 and a recess 17 in the individual rollers 2. In order to withstand the high mechanical stresses exerted by the symbolically illustrated steel strand S, the strand guide roller 1 is rotatably mounted both in the outer regions 5 of the roller and in the region 6 between two individual rollers 2a, 2b. The strand guide roller 1 here is supported on the bearing blocks 4 via the bearings (e.g. a ball bearing or a plain bearing), which are not shown in detail. In order to withstand the high thermal stresses, the individual rollers 2a, 2b each comprise an inner cooling water duct 3. By this means, the surface temperature of the strand guide roller 1 is limited and/or selectively set. The strand S is likewise cooled via the circumferential surface of the roller 1. In order to prevent overheating of the bearings in the bearing blocks 4 (particularly in the event of a casting stoppage or a decrease in the casting speed), the lower parts 4a of the bearing blocks 4 are so embodied as to each have two holes 14. The lower part 4a of the bearing block 4 is connected to the upper part 4b in a detachable manner. Each bearing block 4 is connected to a bracket 10 in a leak-proof manner in each case, wherein the two outer brackets 10a, the inner bracket 10b and the coolant pipes 11 between every two successive brackets 10 form the manifold bar 7. The strand guide roller 1 is supplied with cooling water via the manifold bar 7.

On the one hand, cooling water (the liquid cooling fluid which may also contain other components in addition to $H_2O$ is likewise referred to as cooling water in this application) is introduced via the first connection 8 in the outer bracket 10a that is illustrated on the right-hand side, and from the bracket 10a via the line 12 into the coolant duct 3 of the strand guide roller 1. After the cooling water has flowed through the ducts 3 of the two individual rollers 2, it is discharged from the strand guide roller 1 via the line 12 to the first connection 8 in the outer bracket 10a that is illustrated on the left-hand side. In order to prevent the schematic illustration from becoming unnecessarily complicated, a detailed illustration of the rotary inlets 13 between the fixed lines 12 and the rotating strand guide roller 1 has been omitted. Rotary inlets are well-known to a person skilled in the art.

On the other hand, cooling water is carried via the second connection 9 in the outer bracket 10a that is illustrated on the right-hand side to the bearing blocks 4. According to the invention, each bracket 10a, 10b is connected to a bearing block 4 in a leak-proof manner. The connection between two adjacent brackets 10a-10b and 10b-10a is effected via two coolant pipes 11. The heated cooling water is discharged via the second connection 9 in the outer bracket 10a that is illustrated on the left-hand side.

For the purpose of cooling, the lower parts 4a of the bearing blocks 4 each have two holes 14, these being staggered in the direction of casting R. In the case of rollers 1 which are subjected to even higher thermal stresses, the upper parts 4b of the bearing blocks 4 can additionally feature an annular water duct 15, such that the cooling water can flow from a first hole 14 in the lower part 4a into the upper part 4b, and from the upper part 4b via the water duct 15, which is arranged concentrically relative to the spigot 16, into a second hole 14 and into the lower part 4a (see FIG. 8). As a result, the bearing block 4 and the bearing are effectively protected against overheating and/or a bearing temperature can be selectively set.

The first and second connections 8,9 of the outer brackets 10a of the manifold bar 7 may be situated on the underside of the brackets 10a as per the illustration or laterally relative to the bracket, for example. A lateral arrangement is advantageous, since shims 19 can easily be inserted under the bracket 10a for the purpose of setting the height of the strand guide roller 1 (see FIGS. 2, 3, 5, 6 and 8), without said shims affecting the proofness of the fluid connection.

A second embodiment variant of a strand guide roller according to the invention is illustrated in the FIGS. 2 to 8. In contrast with FIG. 1, the strand guide roller 1 is composed of three individual rollers 2a . . . 2c. The two outer regions of the roller 1 and the inner regions between two individual rollers 2a-2b and 2b-2c are rotatably mounted at a bearing block 4 in each case. The bearing blocks 4 are connected in a detachable manner to a manifold bar 7, wherein the height of the manifold bar—and hence of the strand guide roller 1 likewise—can easily be set by means of shims 19. The shims 19 are situated between a crossbar (not shown) of a strand guide segment and a bracket 10 of the manifold bar 7. The manifold bar 7 is also used to supply the roller 1 with cooling water.

Figure 3:
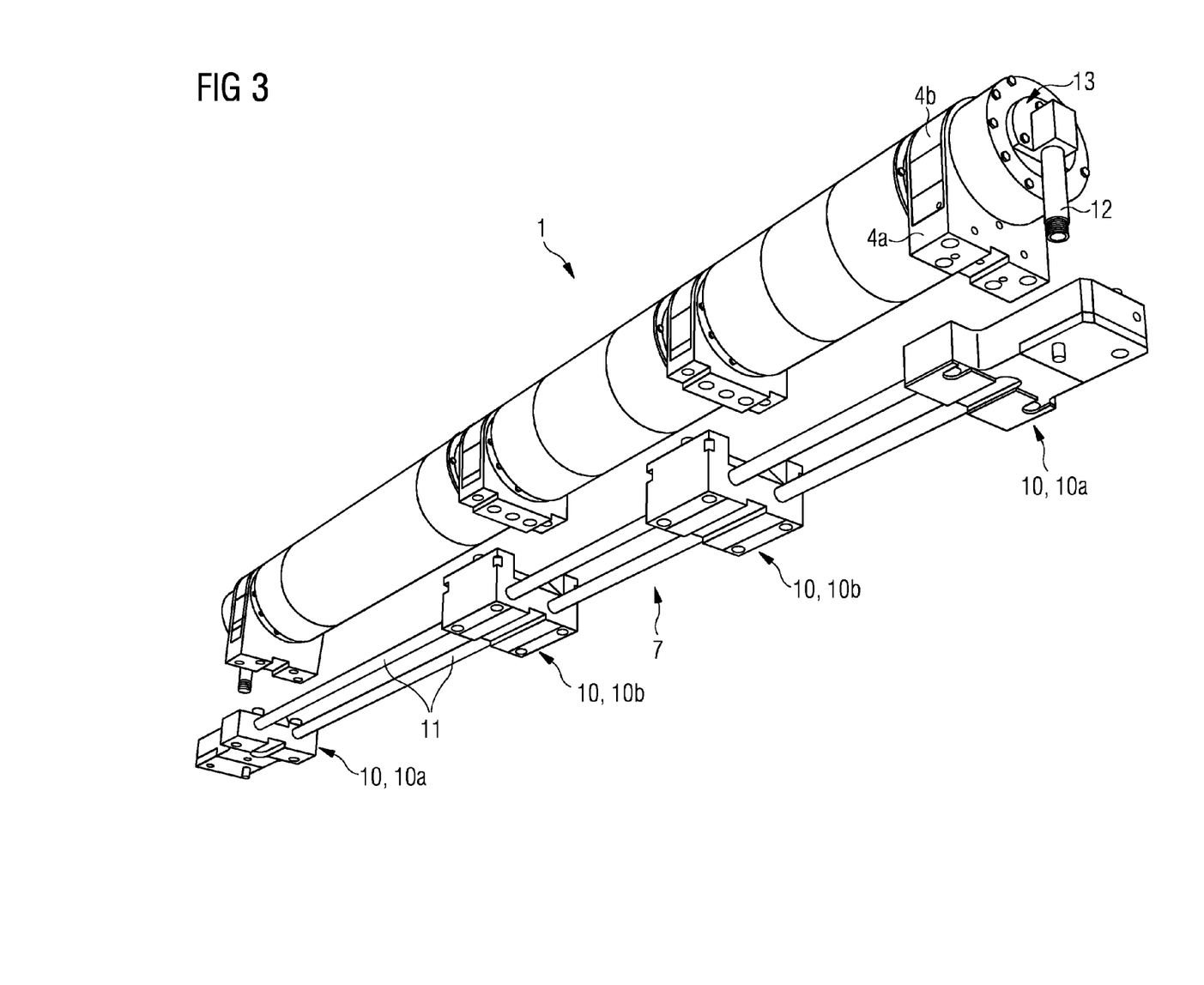
FIG. 3 shows an exploded view of the illustration as per FIG. 2.
Figure 4:
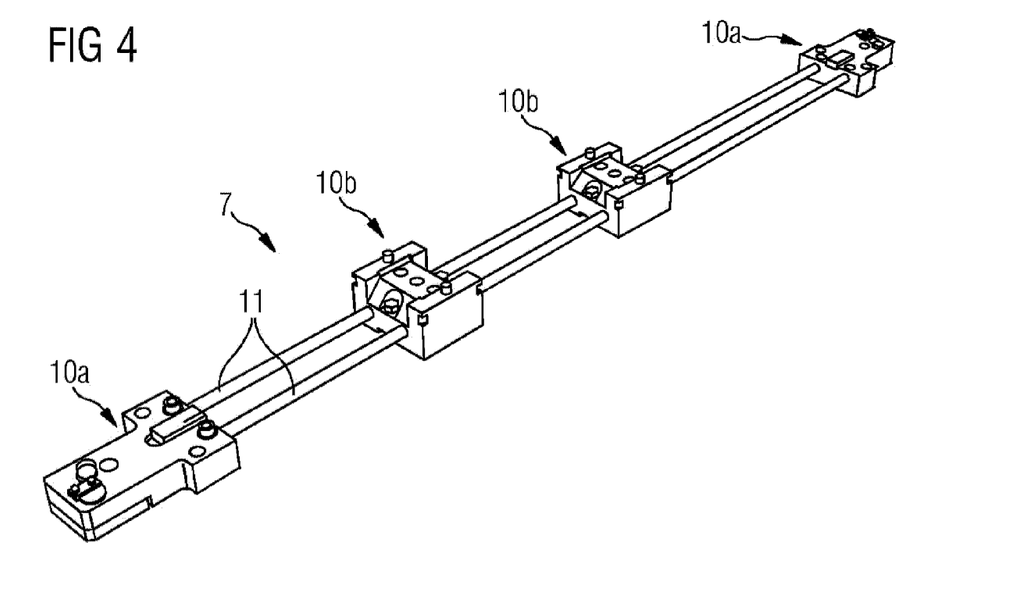
FIG. 4 shows an illustration of the manifold bar as per FIG. 2.

FIG. 3 shows an exploded view of the strand guide roller 1 with the manifold bar 7. The manifold bar 7 is illustrated separately in FIG. 4. It can be seen from FIG. 2 that cooling water is introduced via a first connection 8 in the outer bracket 10a into the line 12, and from the line 12 via a rotary inlet (e.g. a Prelonring, see e.g. WO 2011/117383 A1) into an inner cooling duct 3 (not shown in detail) of the strand guide roller 1. The cooling water is discharged in a similar manner at the other end of the manifold bar. The second connection 9 in the outer bracket 10a allows cooling water to be carried both into the lower part 4a of the bearing block 4 and via the coolant pipes 11 to the subsequent brackets.

Figure 7:
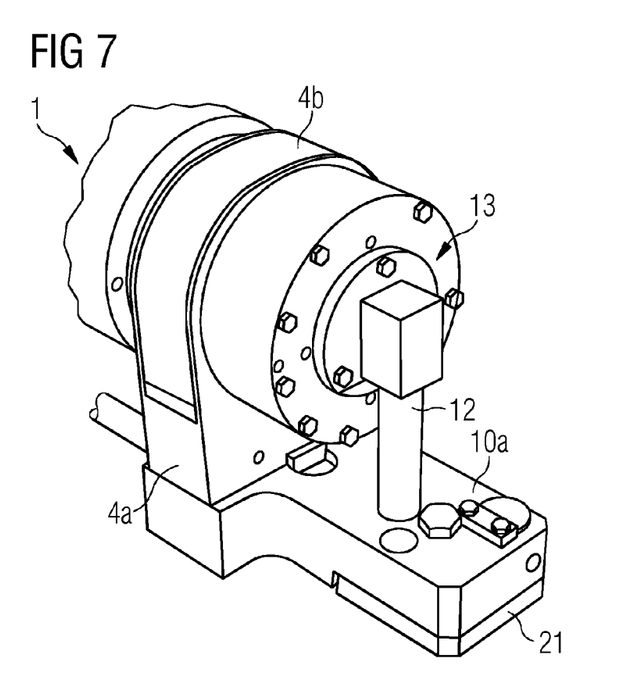
FIG. 7 shows a detailed illustration of an outer bracket.
Figure 8:
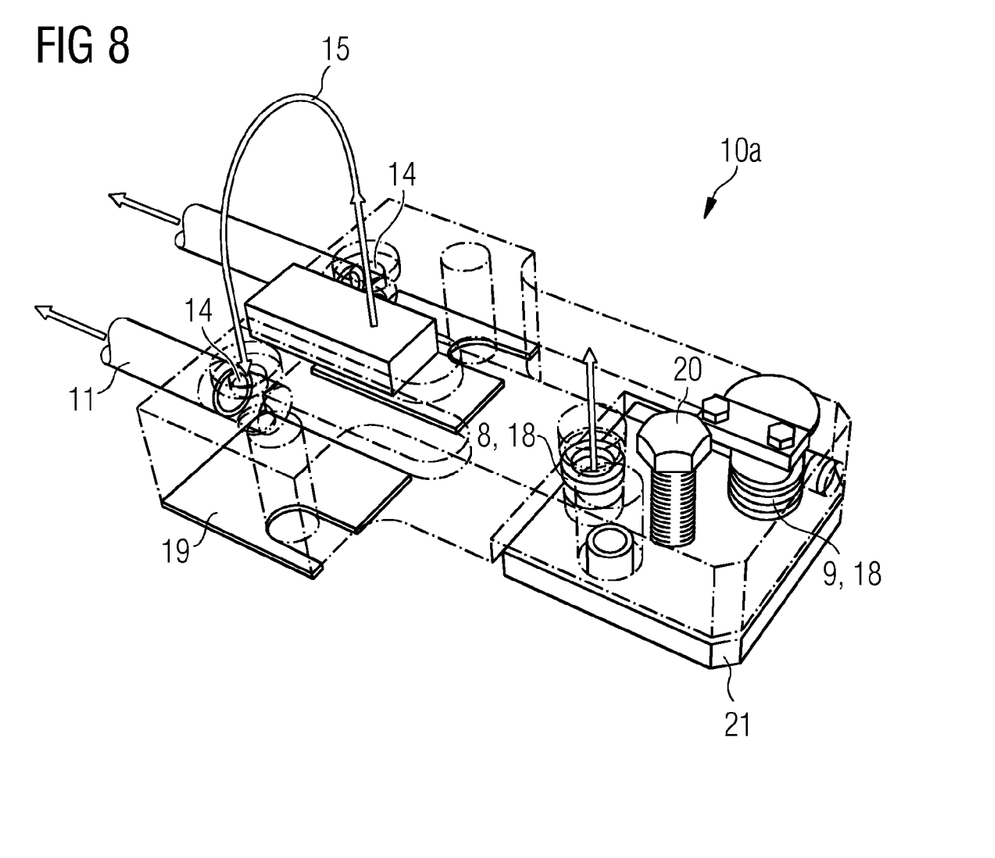
FIG. 8 shows an illustration of the holes for FIG. 7.

The flow of the cooling water in an outer bracket 10a is illustrated again in greater detail in FIGS. 7 and 8. As described above, cooling water is introduced via a non-screwed pipe 18 and the first connection 8 into the outer bracket 10a, and is guided from the outer bracket 10a via the line 12 to the strand guide roller 1. In addition to this, a separate cooling water circuit is provided for the cooling of the bearing blocks 4, wherein cooling water is likewise introduced via a non-screwed pipe 18 and the second connection 9 into the outer bracket 10a, from where it cools both the bearing block 4 which is connected to the outer bracket 10a, and supplies the inner brackets 10b via the two coolant pipes 11. Provision is also made in the upper part 4b of the bearing block 4 for an annular water duct 15 which connects the two holes in the lower part 4a of the bearing block 4, such that cooling water from the rearward illustrated hole 14 in the bracket 10a can pass through the lower part 4a of the bearing block 4 and via an annular water duct 15 in the upper part 4b of the bearing block 4 and through the lower part 4a of the bearing block 4 into the forward illustrated hole 14 in the bracket. The direction of flow of the cooling water is illustrated by arrows. In order to allow simple and accurate manufacture of the outer bracket 10a, the outer bracket 10a advantageously comprises an intermediate plate 21, the first connection 8 and the second connection 9 being located on the underside of the intermediate plate 21. The seal between a strand guide segment (not shown) and a first or second connection 8,9 in the intermediate plate 21 is provided by means of non-screwed pipes 18, since the height of the bracket 10a can be adjusted relative to the strand guide segment by means of the screw 20. The seal between the intermediate plate 21 and the remaining part of the bracket 10a is provided via O-rings, since the intermediate plate 21 does not move relative to the remaining part of the bracket 10a in the event of a height adjustment. The bearing block 4, which is divided into a lower part 4a and an upper part 4b by a horizontal plane running through the rotational axis of the strand guide roller 1, is embodied as a single component (monoblock).

Figure 5:
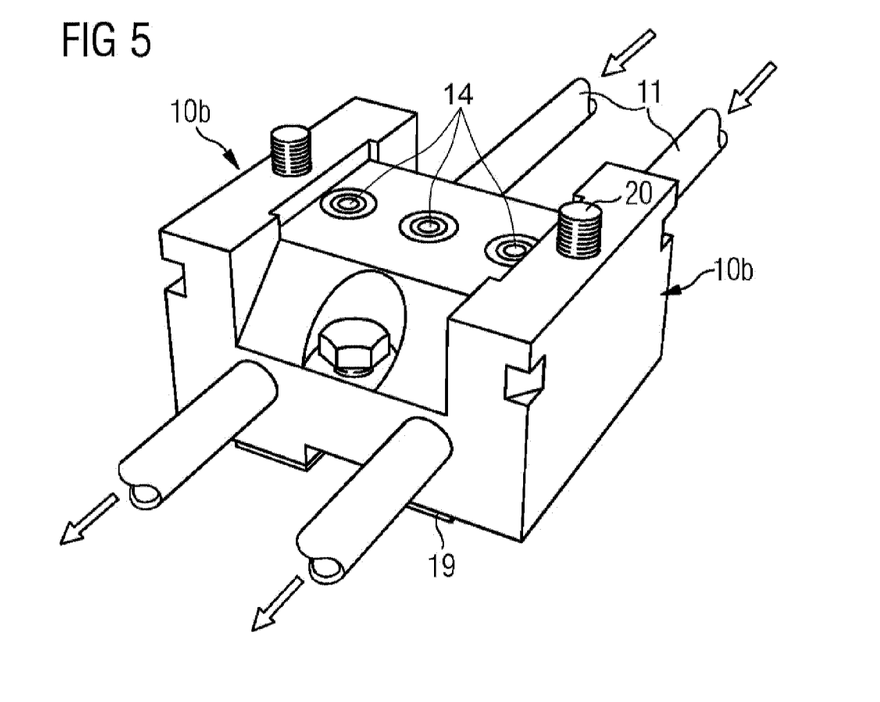
FIG. 5 shows a detailed illustration of a central bracket.
Figure 6:
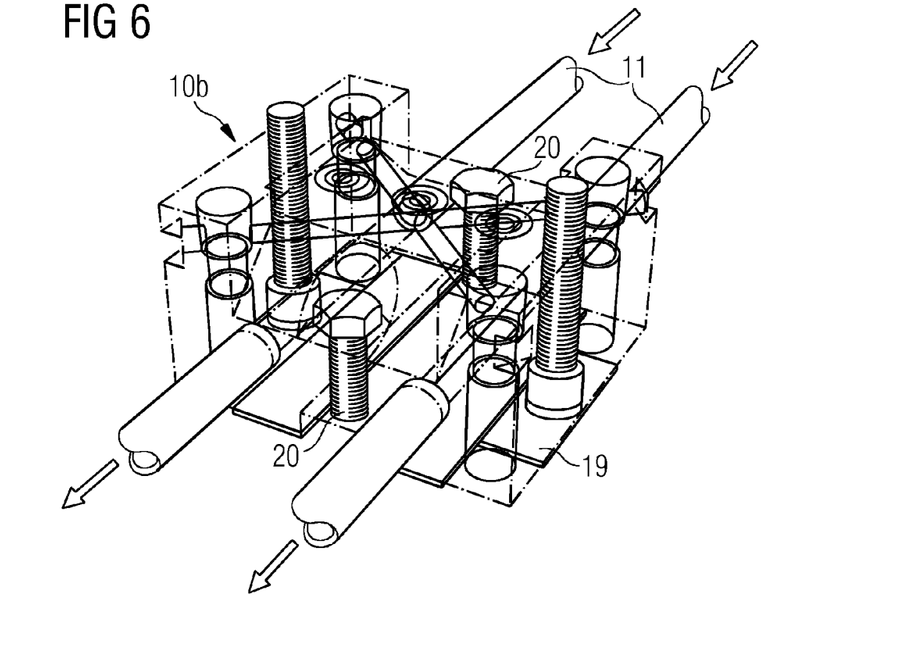
FIG. 6 shows an illustration of the holes for FIG. 5.

The flow of the cooling water in a central bracket 10b is illustrated in greater detail in FIGS. 5 and 6. As described above, the central bracket 10b is supplied with cooling water by the two coolant pipes 11. The direction of flow of the cooling water is again indicated by arrows. The cooling water arriving through the two coolant pipes 11 is guided via three holes 14 into the bearing block 4 (not shown), which is connected to the bracket 10b by means of non-screwed pipes with seals (not shown). In addition, cooling water is carried to the inner bracket 10b shown second from the left in FIG. 4. The intersecting holes in the upper region of the bracket 10b are used to supply lubricant to a rolling bearing (not shown) in the bearing block 4.

When setting the height of the strand guide roller, the height of the manifold bar 7 is first set by means of screws 20 (see FIGS. 5 to 8) relative to a strand guide segment (not shown). Shims 19 are then inserted between a bar of the strand guide and the manifold bar 7, thereby ensuring that the manifold bar 7 lies flat on the bar and the strand guiding forces are therefore reliably transferred into the strand support structure.

Although the invention has been illustrated and described in detail with reference to the preferred exemplary embodiments, the invention is not restricted by the examples disclosed herein, and other variations may be derived therefrom by a person skilled in the art without thereby departing from the scope of the invention.

LIST OF REFERENCE SIGNS

1 Strand guide roller
2 Individual roller
2a . . . 2c First, second and third individual roller
3 Duct
4 Bearing block
4a Lower part of the bearing block
4b Upper part of the bearing block
5 Outer region of the strand guide roller
6 Region between two individual rollers
7 Manifold bar
8 First connection
9 Second connection
9 Bracket
10a Outer bracket
10b Inner bracket
11 Coolant pipe
12 Line
13 Rotary inlet
14 Hole
15 Water duct
16 Spigot
17 Recess
18 Non-screwed pipe
19 Shim
20 Screw
21 Intermediate plate
R Direction of casting
S Cast strand

The invention claimed is:

1. A strand guide roller for guiding a metal strand in a continuous casting machine, the strand guide roller comprising:
at least one first and one second individual roller in an axial row, wherein the first individual roller is connected in a non-rotatable manner to the second individual roller to define the strand guide roller, the individual rollers each have a duct for internal cooling and together form a cooled strand guide roller;
the strand guide roller having an outer region;
at least three bearing blocks, wherein the outer region of the cooled strand guide roller and a region between two of the individual rollers are rotatably mounted at at least one of the bearing blocks;
a manifold bar for supplying the strand guide roller with cooling water, the manifold bar comprising a plurality of brackets and at least one coolant pipe in between each two successive brackets for the fluidic connection of the brackets, wherein a first bracket of the two successive brackets has in each case at least one first connection for the internal cooling of the cooled strand guide roller and at least one second connection for cooling the bearing blocks, the first connection is fluidically connected to the ducts of the individual rollers and the second connection is fluidically connected via the brackets to the bearing blocks; and
wherein one of the brackets comprises an intermediate plate which is aligned parallel with the direction of casting and has at least one of the first connections and at least one of the second connections.

2. The strand guide roller as claimed in claim 1, wherein there are two of the outer brackets toward opposite ends of the strand guide roller and each outer bracket has the first connection and the second connection.

3. The strand guide roller as claimed in claim 2, wherein each outer bracket has two first connections and two second connections.

4. The strand guide roller as claimed in claim 1, wherein the manifold bar comprises two coolant pipes between two successive ones of brackets for the purpose of connecting the two successive brackets.

5. The strand guide roller as claimed in claim 1, wherein a first connection of an outer bracket is connected via a line and a rotary inlet to a duct of the individual roller.

6. The strand guide roller as claimed in claim 1, wherein at least one of the bearing blocks is divided into a respective lower part and upper part by a horizontal plane running through the rotational axis of the strand guide roller, wherein the lower part has at least two holes which are staggered in the direction of casting.

7. The strand guide roller as claimed in claim 6, wherein the upper part has a water duct which carries cooling water from a first hole in the lower part around the bearing and into a second hole in the lower part.

8. The strand guide roller as claimed in claim 1, wherein one end of the first individual roller includes a spigot and one end of the second individual roller includes a recess for accommodating the spigot, and the spigot is connected to the recess in a non-rotatable manner.

9. The strand guide roller as claimed in claim 1, wherein the fluidic connection between one of the brackets and one of the bearing blocks is effected by a non-screwed pipe or an O-ring.

10. The strand guide roller as claimed in claim 1, wherein the intermediate plate is arranged on an underside of the first bracket.

11. The strand guide roller as claimed in claim 1, further comprising a strand guide segment connected in a detachable manner to one of the brackets of the manifold bar, and the strand guide segment is fluidically connected to one of the outer brackets by a non-screwed pipe.

12. The strand guide roller as claimed in claim 11, wherein one of the brackets has a screw configured for adjusting the height of the bracket relative to the strand guide segment, and a shim is arranged between the bracket and the strand guide segment.

13. The strand guide roller as claimed in claim 1, wherein the first one of the brackets in the axial row is an outer bracket of the strand guide roller.

14. The strand guide roller as claimed in claim 1, wherein the one bracket comprising an intermediate plate is an outer bracket of the strand guide roller.

* * * * *